US011783811B2

(12) United States Patent
Kurata et al.

(10) Patent No.: US 11,783,811 B2
(45) Date of Patent: Oct. 10, 2023

(54) ACCURACY OF STREAMING RNN TRANSDUCER

(71) Applicant: INTERNATIONAL BUSINESS MACHINES CORPORATION, Armonk, NY (US)

(72) Inventors: Gakuto Kurata, Tokyo (JP); George Andrei Saon, Stamford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 463 days.

(21) Appl. No.: 17/031,345

(22) Filed: Sep. 24, 2020

(65) Prior Publication Data

US 2022/0093083 A1     Mar. 24, 2022

(51) Int. Cl.
*G10L 15/16*      (2006.01)
*G06F 17/18*      (2006.01)
(Continued)

(52) U.S. Cl.
CPC .............. *G10L 15/16* (2013.01); *G06F 17/18* (2013.01); *G06F 18/10* (2023.01); *G06N 3/045* (2023.01); *G06N 3/08* (2013.01); *G10L 25/30* (2013.01)

(58) Field of Classification Search
CPC ....... G10L 15/16; G10L 25/30; G10L 15/063; G06F 17/18; G06F 18/10; G06N 3/045; G06N 3/08; G06N 3/044
See application file for complete search history.

(56) References Cited

U.S. PATENT DOCUMENTS 9,786,270 B2 * 10/2017 Senior .................. G10L 15/063
2019/0034795 A1    1/2019 Zitouni et al.
(Continued)

FOREIGN PATENT DOCUMENTS

| CN | 111402894 A | 7/2020 |
| JP | 2019120841 A | 7/2019 |
| WO | 2021002967 A1 | 1/2021 |

OTHER PUBLICATIONS

Kurata et al, Guiding CTC Posterior Spike Timings for Improved Posterior Fusion and Knowledge Distillation, https://arxiv.org/abs/1904.08311, Jul. 2, 2019, pp. 1-5 (Year: 2019).*

(Continued)

*Primary Examiner* — Linda Wong
(74) *Attorney, Agent, or Firm* — Tutunjian & Bitetto, P.C.; Randy Emilio Tejeda

(57) ABSTRACT

A computer-implemented method is provided for model training. The method includes training a second end-to-end neural speech recognition model that has a bidirectional encoder to output same symbols from an output probability lattice of the second end-to-end neural speech recognition model as from an output probability lattice of a trained first end-to-end neural speech recognition model having a unidirectional encoder. The method also includes building a third end-to-end neural speech recognition model that has a unidirectional encoder by training the third end-to-end neural speech recognition model as a student by using the trained second end-to-end neural speech recognition model as a teacher in a knowledge distillation method.

19 Claims, 10 Drawing Sheets

(51) Int. Cl.
*G06N 3/08* (2023.01)
*G10L 25/30* (2013.01)
*G06F 18/10* (2023.01)
*G06N 3/045* (2023.01)

(56) References Cited

U.S. PATENT DOCUMENTS

| | | | |
|---|---|---|---|
| 2019/0385595 A1 | 12/2019 | Wabgaonkar et al. | |
| 2020/0074292 A1 | 3/2020 | Kurata et al. | |
| 2020/0126538 A1 | 4/2020 | Han et al. | |
| 2020/0372906 A1 | 11/2020 | Jang et al. | |
| 2021/0350786 A1* | 11/2021 | Chen | G10L 13/08 |
| 2022/0262350 A1* | 8/2022 | Rao | G10L 15/16 |
| 2023/0186907 A1* | 6/2023 | Hu | G10L 15/063 704/232 |

OTHER PUBLICATIONS

International Search Report issued in PCT Application No. PCT/CN2022/072268, dated Apr. 13, 2022, pp. 1-9.
Li et al., "Improving RNN Transducer Modeling for End-to-End Speech Recognition", arXiv:1909.12415v1 [cs.CL] Sep. 26, 2019, 8 pages.
Rao et al., "Exploring Architectures, Data and Units for Streaming End-to-End Speech Recognitionwith RNN-Transducer", arXiv:1801.00841v1 [cs.CL] Jan. 2, 2018, 7 pages.
Kurata et al., "Improved Knowledge Distillation From Bi-Directional to Uni-Directional LSTM CTC for End-to-End Speech Recognition", 2018 IEEE Spoken Language Technology Workshop (SLT), Dec. 2018, 7 pages.
Mun'im, et al., "Sequence-Level Knowledge Distillation for Model Compression of Attention-Based Sequence-to-Sequence Speech Recognition", arXiv:1811.04531v1 [cs.CL] Nov. 12, 2018, 5 pages.
Mell et al. "The NIST Definition of Cloud Computing", NIST Special Publication 800-145, 2011, 7 pages.
Takashima et al., "An Investigation of a Knowledge Distillation Method for CTC Acoustic Models", ICASSP 2018, Apr. 2018, pp. 5809-5813.
Kurata, Gakuto, et al. "Guiding CTC posterior spike timings for improved posterior fusion and knowledge distillation", arXiv preprint arXiv:1904.08311. Apr. 17, 2019, pp. 1-5.
Sainath, Tara N., et al. "Two-pass end-to-end speech recognition", arXiv preprint arXiv:1908.10992. Aug. 29, 2019, pp. 1-5.
Hu, Ke, et al. "Deliberation model based two-pass end-to-end speech recognition", InICASSP 2020—2020 IEEE International Conference on Acoustics, Speech and Signal Processing (ICASSP). May 4, 2020, pp. 7799-7803.
International Search Report issued in PCT Application No. PCT/EP2021/075007, dated Jan. 5, 2022, pp. 1-11.

* cited by examiner

ACCURACY OF STREAMING RNN TRANSDUCER

BACKGROUND

The present invention relates generally to information processing and, in particular, to improving the accuracy of a streaming Recurrent Neural Network (RNN) transducer for end-to-end speech recognition.

End-to-end training of RNN transducer (RNN-T) models does not require frame-level alignments between audio and output symbols. As a result, corresponding nodes in the posterior lattices defined by the joint networks from different RNN-T models can emit different symbols, which poses a new set of challenges in knowledge distillation between RNN-T models. In particular, these discrepancies in the posterior lattices are prominent between an offline RNN-T model and a streaming RNN-T model because the streaming RNN-T model emits symbols later than the offline RNN-T model.

SUMMARY

According to aspects of the present invention, a computer-implemented method is provided for model training. The method includes training a second end-to-end neural speech recognition model that has a bidirectional encoder to output same symbols from an output probability lattice of the second end-to-end neural speech recognition model as from an output probability lattice of a trained first end-to-end neural speech recognition model having a unidirectional encoder. The method also includes building a third end-to-end neural speech recognition model that has a unidirectional encoder by training the third end-to-end neural speech recognition model as a student by using the trained second end-to-end neural speech recognition model as a teacher in a knowledge distillation method.

According to other aspects of the present invention, a computer program product is provided for model training. The computer program product includes a non-transitory computer readable storage medium having program instructions embodied therewith, the program instructions executable by a computer to cause the computer to perform a method. The method includes training a second end-to-end neural speech recognition model that has a bidirectional encoder to output same symbols from an output probability lattice of the second end-to-end neural speech recognition model as from an output probability lattice of a trained first end-to-end neural speech recognition model having a unidirectional encoder. The method also includes building a third end-to-end neural speech recognition model that has a unidirectional encoder by training the third end-to-end neural speech recognition model as a student by using the trained second end-to-end neural speech recognition model as a teacher in a knowledge distillation method.

According to yet other aspects of the present invention, a computer processing system is provided for model training. The computer processing system includes a memory device for storing program code. The computer processing system further includes a hardware processor operatively coupled to the memory device for running the program code to train a second end-to-end neural speech recognition model that has a bidirectional encoder to output same symbols from an output probability lattice of the second end-to-end neural speech recognition model as from an output probability lattice of a trained first end-to-end neural speech recognition model having a unidirectional encoder. The hardware processor also runs the program code to build a third end-to-end neural speech recognition model that has a unidirectional encoder by training the third end-to-end neural speech recognition model as a student by using the trained second end-to-end neural speech recognition model as a teacher in a knowledge distillation method.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to improving the accuracy of a streaming Recurrent Neural Network (RNN) transducer for end-to-end speech recognition.

In accordance with an embodiment of the present invention, a method is proposed to train a RNN-T model so that the nodes of its posterior lattice emit the same symbols with the corresponding nodes of the posterior lattice from the pre-trained RNN-T model. By utilizing this method, an offline RNN-T model can be trained that can serve as a good teacher to train a student streaming RNN-T model.

It is to be appreciated that while RNN-T models are primarily described in the embodiments set forth herein, other models including, for example, but not limited to, transformer transducers, RNN-transducer with stateless prediction network, and so forth.

Figure 1:
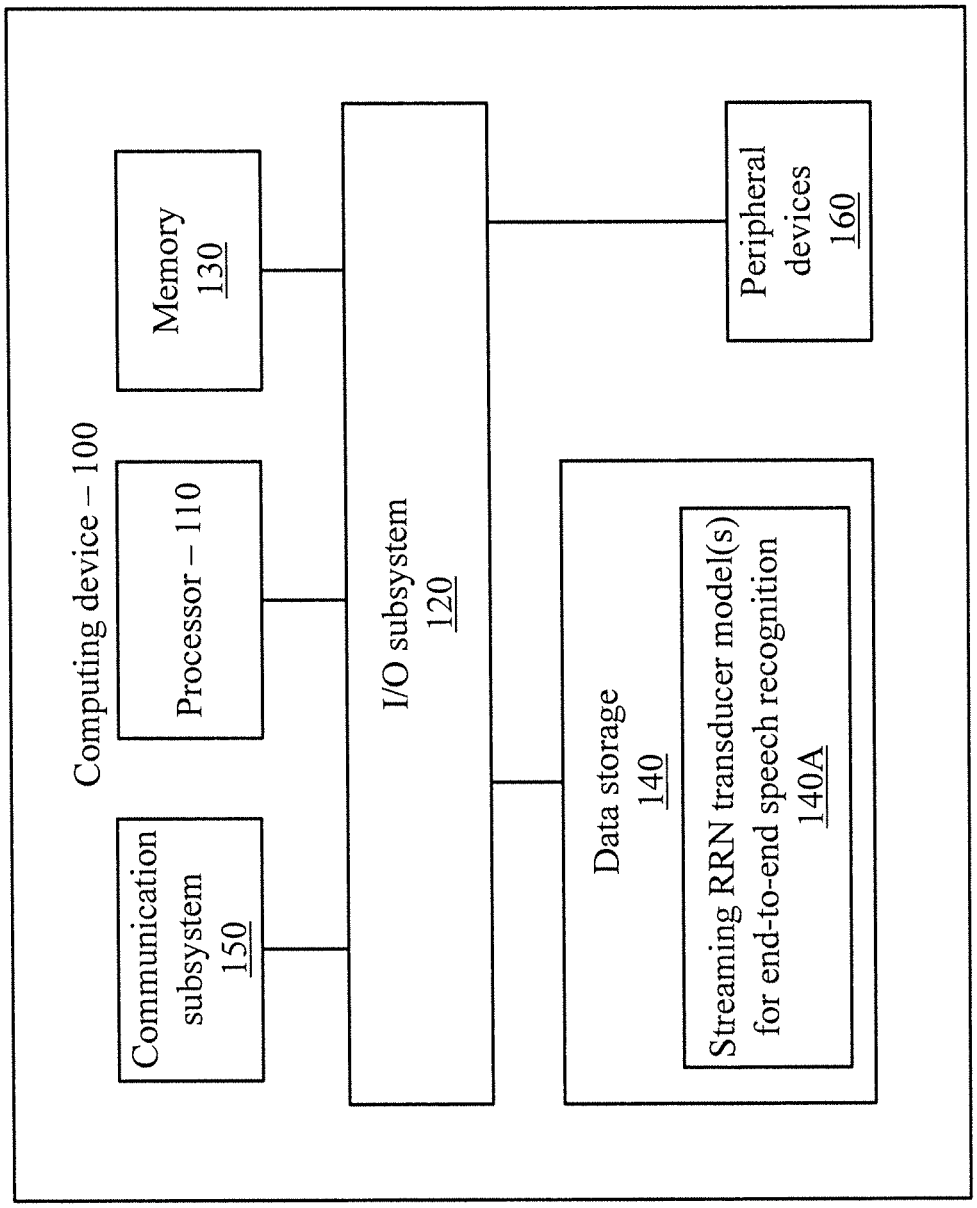
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to improve the accuracy of a streaming RNN transducer model for end-to-end speech recognition.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for (improving the accuracy of) a streaming RNN transducer model(s) for end-to-end speech recognition. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 11-12). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
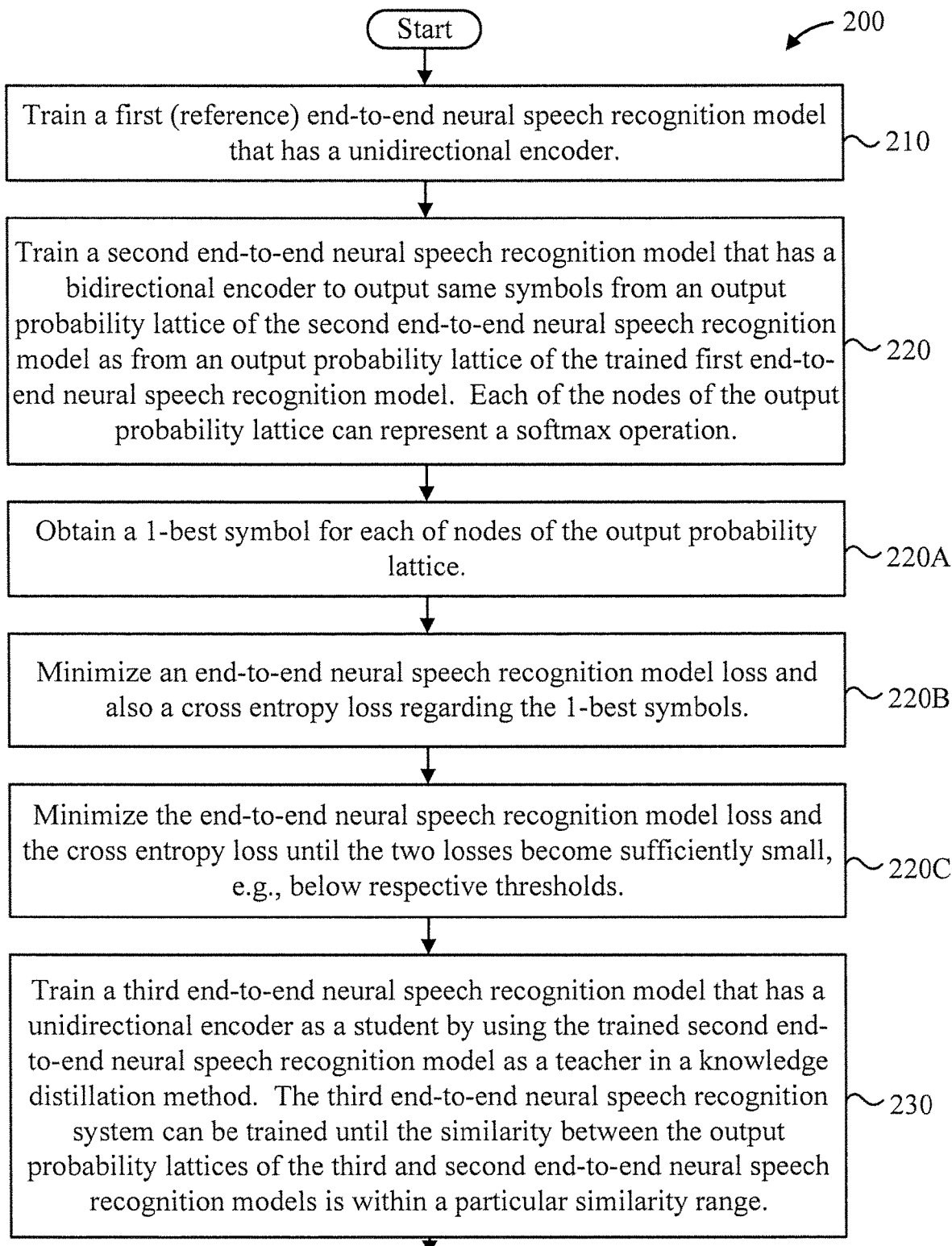
FIGS. 2-3 show an exemplary method for improving the accuracy of a streaming RNN transducer for end-to-end speech recognition, in accordance with an embodiment of the present invention.
Figure 3:
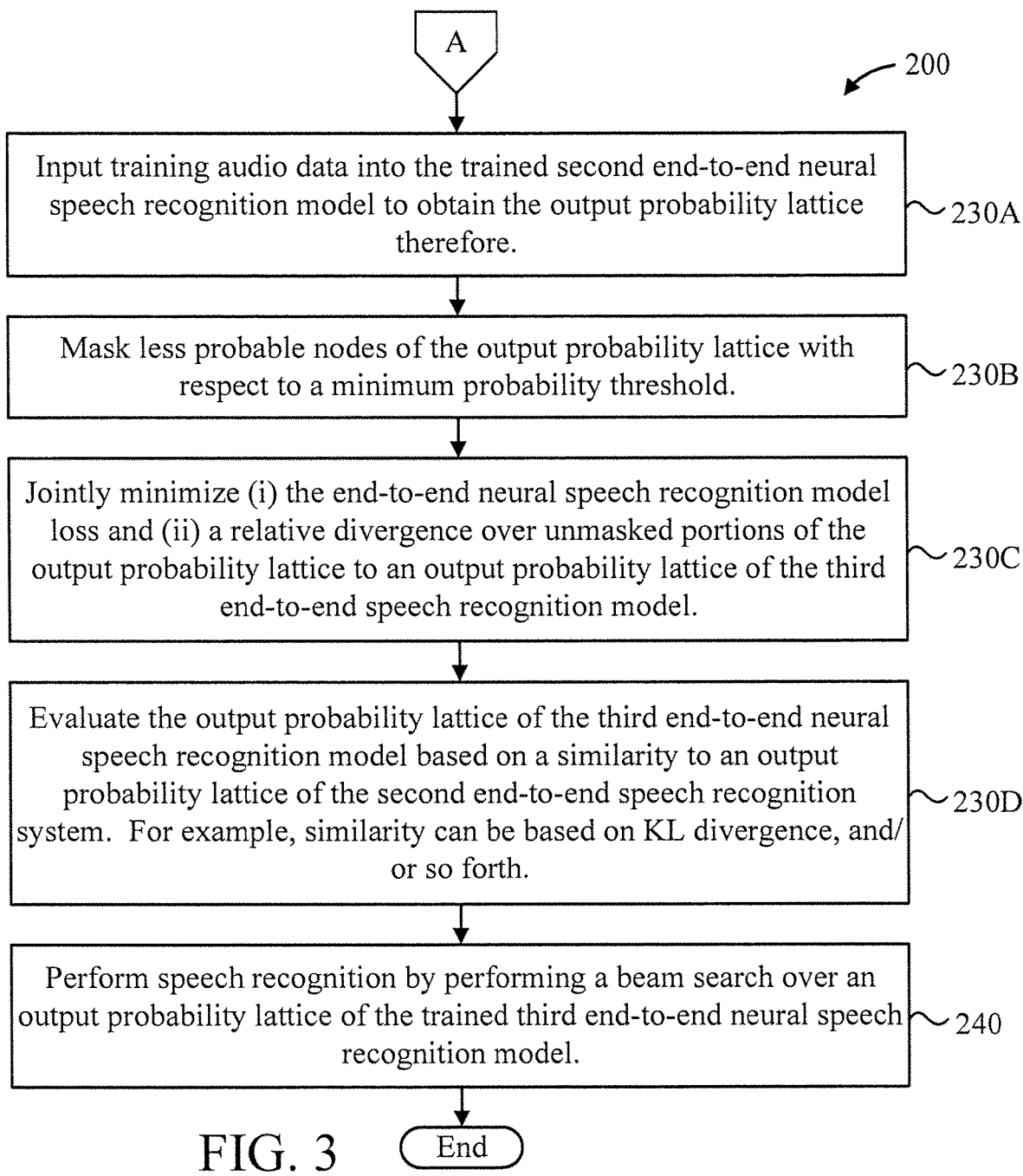

These and other variations of a hardware processor subsystem are also contemplated in accordance with embodiments of the present invention FIGS. 2-3 show an exemplary method 200 for improving the accuracy of a streaming RNN transducer for end-to-end speech recognition, in accordance with an embodiment of the present invention.

At block 210, train a first end-to-end neural speech recognition model that has a unidirectional encoder. In an embodiment, the first end-to-end neural speech recognition model can be considered a reference end-to-end neural speech recognition model.

At block 220, train a second end-to-end neural speech recognition model that has a bidirectional encoder to output same symbols from an output probability lattice of the second end-to-end neural speech recognition model as from an output probability lattice of the trained first end-to-end neural speech recognition model. In an embodiment, the training can be performed with respect to an end-to-end neural speech recognition model loss (RNN-T loss) and a cross entropy loss. In an embodiment, the end-to-end neural speech recognition model loss is obtained by referring to labels in the training data. In an embodiment, the cross entropy loss is calculated using the 1-best output symbols from the unidirectional model trained in block 210. In an embodiment, each of the nodes of the output probability lattice can represent a softmax operation. In an embodiment, the second end-to-end neural speech recognition model comprises a stronger or more complex configuration (e.g., a deeper neural network) than the first end-to-end neural speech recognition model.

In an embodiment, block 220 can include one or more of blocks 220A and 220B.

At block 220A, obtain a 1-best symbol for each of nodes of the output probability lattice. This is achieved by feeding the training audio data to the first reference end-to-end speech recognition model and selecting the 1-best symbol from each node in the output posterior lattice.

At block 220B, minimize an end-to-end neural speech recognition model loss and also a cross entropy loss regarding the 1-best symbols.

At 220C, minimize the end-to-end neural speech recognition model loss and the cross entropy loss until the two losses become sufficiently small, e.g., below respective thresholds.

At block 230, train a third end-to-end neural speech recognition model that has a unidirectional encoder as a student by using the trained second end-to-end neural speech recognition model as a teacher in a knowledge distillation method. In an embodiment, the third end-to-end neural speech recognition system can be trained until the similarity between the output probability lattices of the third and second end-to-end neural speech recognition models is within a particular similarity range.

In an embodiment, block 230 includes one or more of blocks 230A, 230B, 230C, and 230D.

At block 230A, input training audio data into the trained second end-to-end neural speech recognition model to obtain the output probability lattice therefor.

At block 230B, mask less probable nodes of the output probability lattice with respect to a minimum probability threshold.

At block 230C, jointly minimize (i) the end-to-end neural speech recognition model loss and (ii) a relative divergence over unmasked portions of the output probability lattice to an output probability lattice of the third end-to-end speech recognition model. The relative divergence can be a Kullback-Leibler divergence or some other divergence.

At block 230D, evaluate the output probability lattice of the third end-to-end neural speech recognition model based on a similarity to an output probability lattice of the second end-to-end speech recognition system. For example, similarity can be based on KL divergence, and/or so forth.

At block 240, perform speech recognition by performing a beam search over an output probability lattice of the trained third end-to-end neural speech recognition model.

In an embodiment, the first and third end-to-end neural speech recognition models stream output data from a RNN transducer, and the second end-to-end neural speech recognition model provides the output data offline.

The first end-to-end neural speech recognition model can be considered a reference model. The second end-to-end neural speech recognition model can be considered as a teacher model. The third end-to-end neural speech recognition model can be considered a student model.

Each of the first, second, and third end-to-end neural speech recognition models employ a Recurrent Neural Network Transducer (RNN-T) architecture. The first and third end-to-end neural speech recognition models are unidirectional, while the second end-to-end neural speech recognition model is bi-directional. The architectures are further described hereinbelow.

Figure 4:
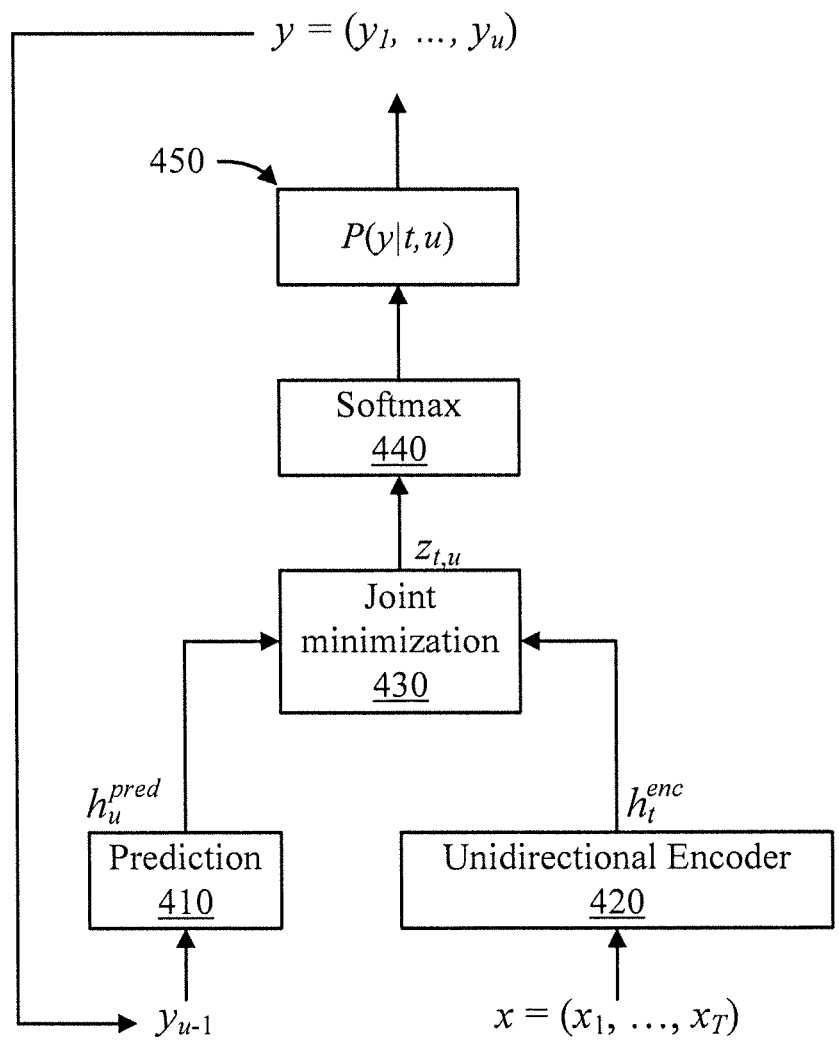
FIG. 4 shows an exemplary unidirectional RNN-T architecture, in accordance with an embodiment of the present invention.

FIG. 4 shows an exemplary unidirectional RNN-T architecture 400, in accordance with an embodiment of the present invention.

The unidirectional RNN-T architecture 400 includes a prediction network 410, a unidirectional encoder block 420, a joint network 430, a softmax block 440, and an output probability lattice 450.

The unidirectional encoder block 420 receives an input feature sequence $x=(x_1, \ldots, x_T)$.

Based on a search over an output probability lattice defined by $P(y|t,u)$, the unidirectional RNN-T architecture 400 generates an output sequence y. In an embodiment, y is a set of possible symbols, t is a time index, and u is a history of emitted symbols.

In detail, the unidirectional encoder block 420 receives the input feature sequence $x=(x_1, \ldots, x_T)$, and outputs an encoding $h_t^{enc}$.

The prediction network 410 receives a prior prediction $y_u-1$ and outputs a prediction $h_u^{pred}$.

The joint network 430 receives $h_t^{enc}$ and $h_u^{pred}$ and outputs $z_{t,u}$.

The softmax block receives $z_{t,u}$ and a softmax of $z_{t,u}$.

The output probability lattice 450, defined by $P(y|t,u)$, receives the softmax of $z_{t,u}$ and outputs sequence $y=(y_1, \ldots, y_u)$.

Figure 5:
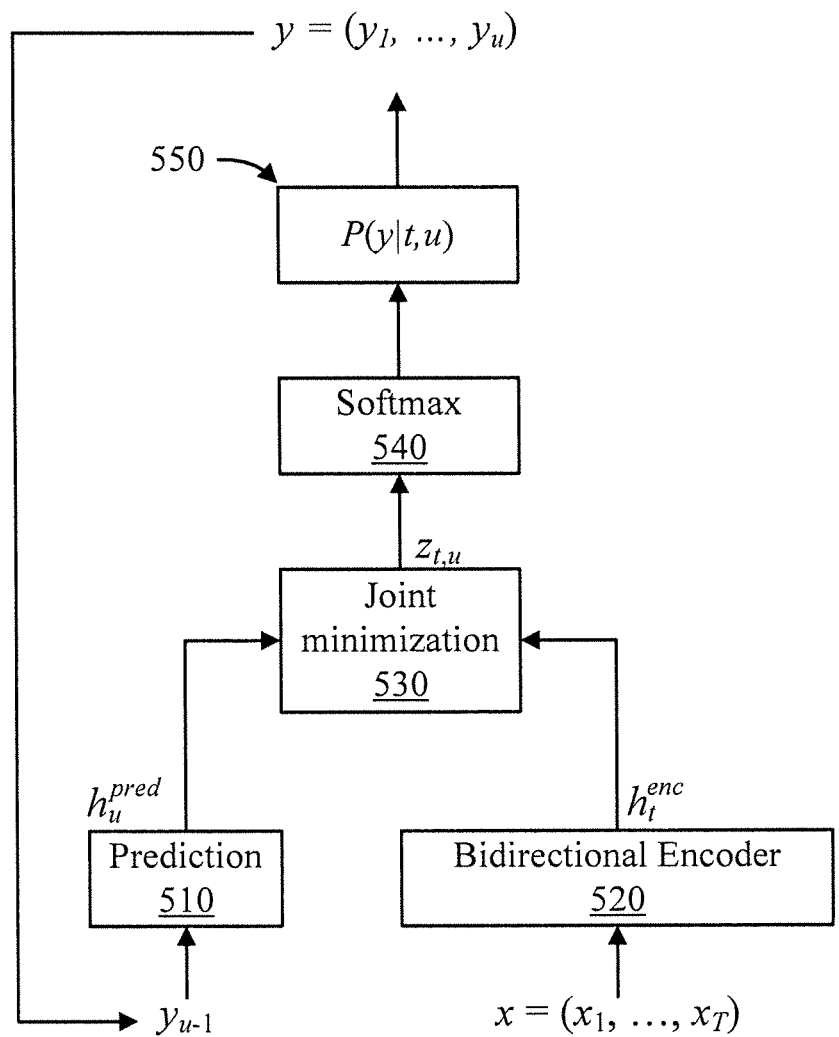
FIG. 5 shows an exemplary bi-directional RNN-T architecture, in accordance with an embodiment of the present invention.

FIG. 5 shows an exemplary bi-directional RNN-T architecture 500, in accordance with an embodiment of the present invention.

The RNN-T architecture 500 includes a prediction network 510, a bidirectional encoder block 520, a joint network 530, a softmax block 540, and an output probability lattice 550.

Figure 6:
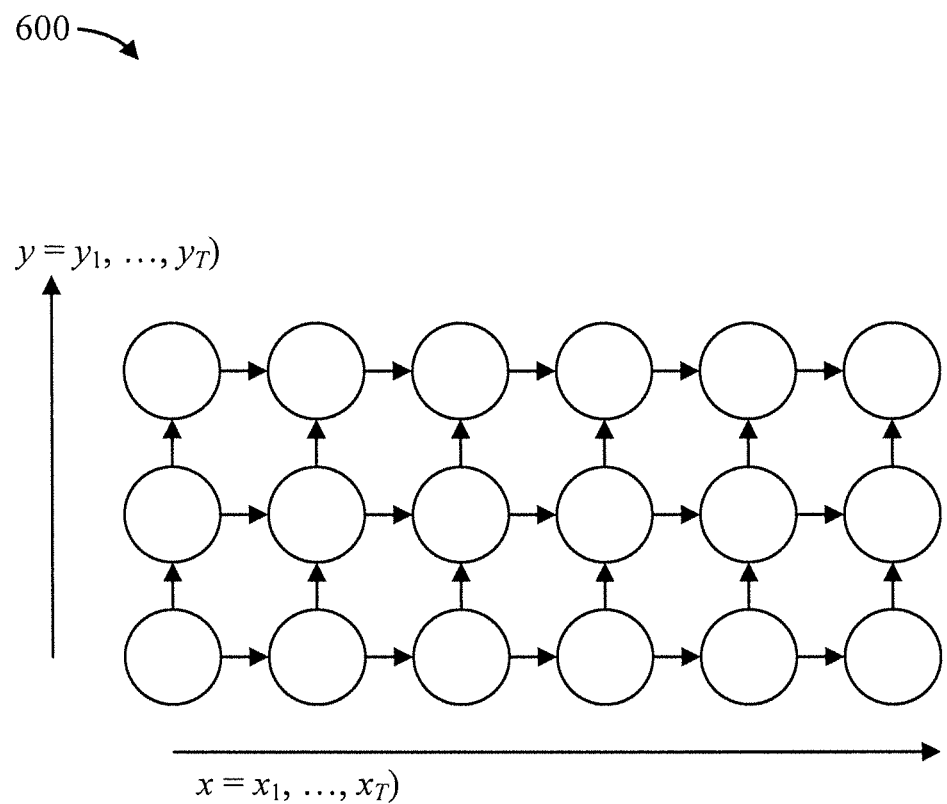
FIG. 6 is a block diagram further showing the output probability lattice of FIGS. 4 and 5, in accordance with an embodiment of the present invention.

FIG. 6 is a block diagram further showing the output probability lattice of FIGS. 4 and 5, in accordance with an embodiment of the present invention.

The output probability lattice 450/550 can be considered relative to an x axis and a y axis such that $x=(x_1, \ldots, x_T)$ and $y=(y_1, \ldots, y_U)$.

Each node in the output probability lattice 450/550 represents a softmax of $z_{t,u}$.

Speech recognition with the RNN-T architecture 400 is realized by a beam search over the output probability lattice 450/550.

Figure 7:
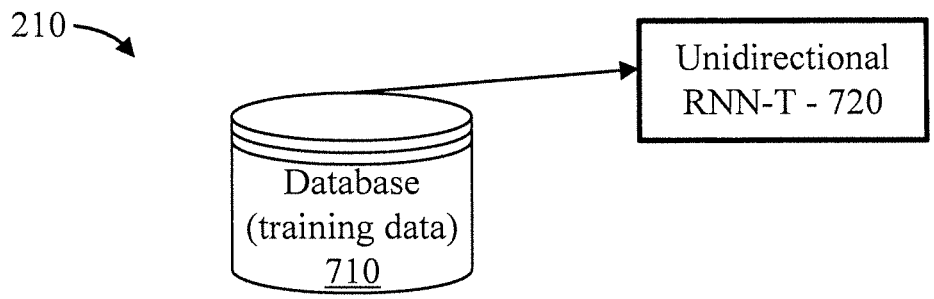
FIG. 7 is a block diagram graphically showing the elements involved in a block of method 200 of FIG. 2, in accordance with an embodiment of the present invention.

FIG. 7 is a block diagram graphically showing the elements involved in block 210 of method 200 of FIG. 2, in accordance with an embodiment of the present invention.

The involved elements in block 210 are a training data database 710, and a unidirectional RNN-T 720. The unidirectional RNN-T 720 can be formed to have a similar architecture to RNN-T architecture 300 of FIG. 3.

Figure 8:
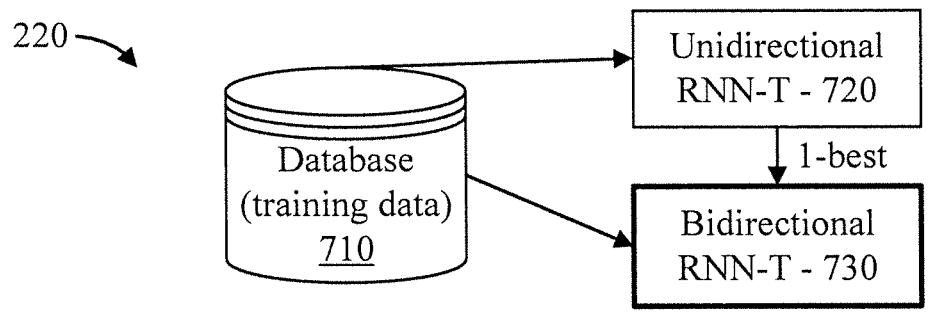
FIG. 8 is a block diagram graphically showing the elements involved in another block of method 200 of FIG. 2, in accordance with an embodiment of the present invention.

FIG. 8 is a block diagram graphically showing the elements involved in block 220 of method 200 of FIG. 2, in accordance with an embodiment of the present invention.

The involved elements in block 220 are the training data database 710 and the unidirectional RNN-T 720, as well as the bi-directional RNN-T 730. The bidirectional RNN-T 720 can be formed to have a similar architecture to RNN-T architecture 500 of FIG. 5.

The 1-best symbol for each node of the output probability lattice is output from the unidirectional RNN-T 720. This is used to train the bidirectional RNN-T 730.

Figure 9:
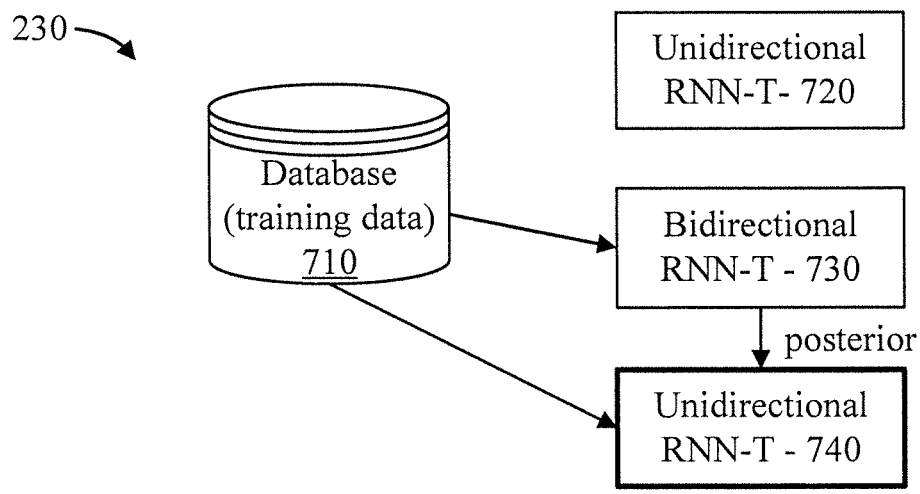
FIG. 9 is a block diagram graphically showing the elements involved in yet another block of method 200 of FIG. 2, in accordance with an embodiment of the present invention.

FIG. 9 is a block diagram graphically showing the elements involved in block 230 of method 200 of FIG. 2, in accordance with an embodiment of the present invention.

The involved elements in block 230 are the training data database 710, the unidirectional RNN-T 720, the bi-directional RNN-T 730, as well as another unidirectional RNN-T 740. The unidirectional RNN-T 740 can be formed to have a similar architecture to RNN-T architecture 300 of FIG. 3.

The output from the trained bidirectional RNN-T (730) is used to train the unidirectional RNN-T (at the bottom). "Posterior" is computed for each node in the output lattice from 730.

Figure 10:
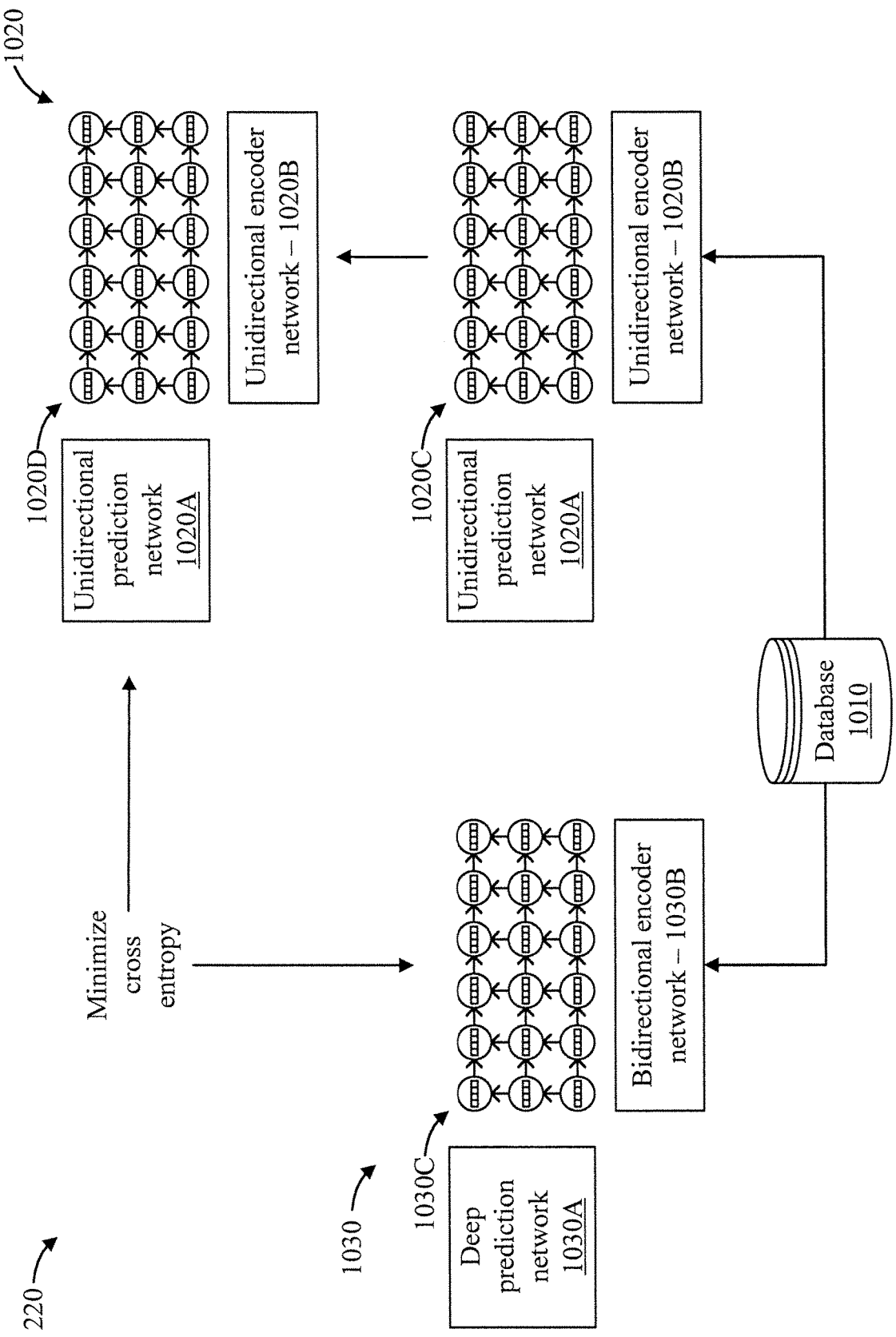
FIG. 10 is a block diagram further graphically showing the RNN-T elements involved in a block of FIG. 2, in accordance with an embodiment of the present invention.

FIG. 10 is a block diagram further graphically showing the RNN-T elements involved in block 220 of FIG. 2, in accordance with an embodiment of the present invention.

The involved elements in block 220 are training data database 1010, unidirectional RNN-T 1020, and bi-directional RNN-T 1030.

The unidirectional RNN-T 1020, which can be considered a reference RNN-T, includes a unidirectional prediction network 1020A, a unidirectional encoder network 1020B, and an output probability lattice 1020C.

The bidirectional RNN-T 1030, which can be considered a teacher RNN-T, includes a deep prediction network 1030A, a bidirectional/deep encoder network 1030B, and an output probability lattice 1030C.

Reference numeral 1020C denotes output lattice from the reference model, while 1020D is the one-best selected from output lattice 1020C. Hence, the same model 1020 is involved on the right side of FIG. 10, just shown essentially at different time steps in relation to obtain the 1 best outputs.

It is to be appreciated that while not shown in FIG. 10, some of the blocks of the output probability lattices can be masked. In an embodiment, masked blocks are ignored in the training of models. This masking is used when training the third network by referring the second network.

Regarding operation, the unidirectional RNN-T 1020 and the bidirectional RNN-T 1030 receive training samples from the training data database 1010. The unidirectional RNN-T 1020 selects 1-best for each node of the output probability lattice 1020C. Cross entropy is minimized between the bidirectional RNN-T 1030 and the unidirectional RNN-T 1040.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
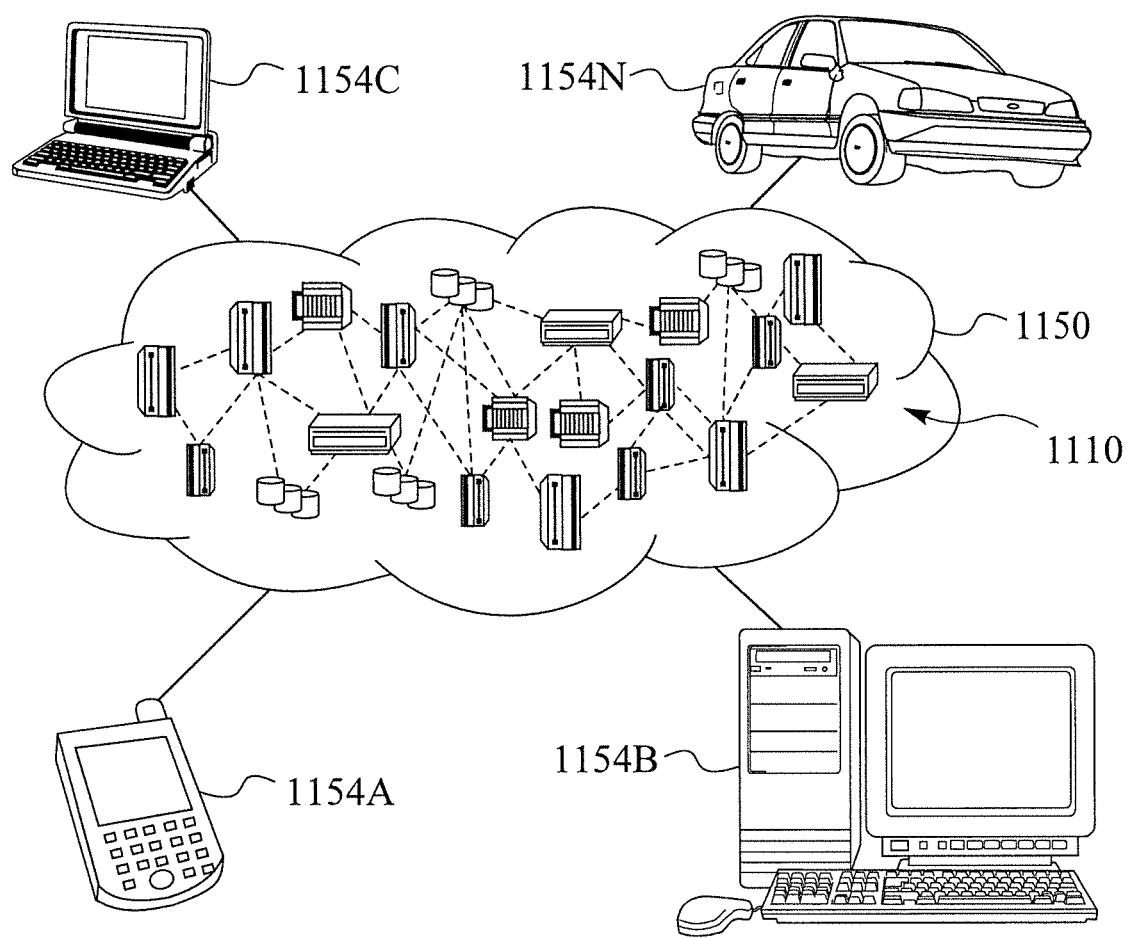
FIG. 11 is a block diagram showing an illustrative cloud computing environment having one or more cloud computing nodes with which local computing devices used by cloud consumers communicate, in accordance with an embodiment of the present invention.

Referring now to FIG. 11, illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
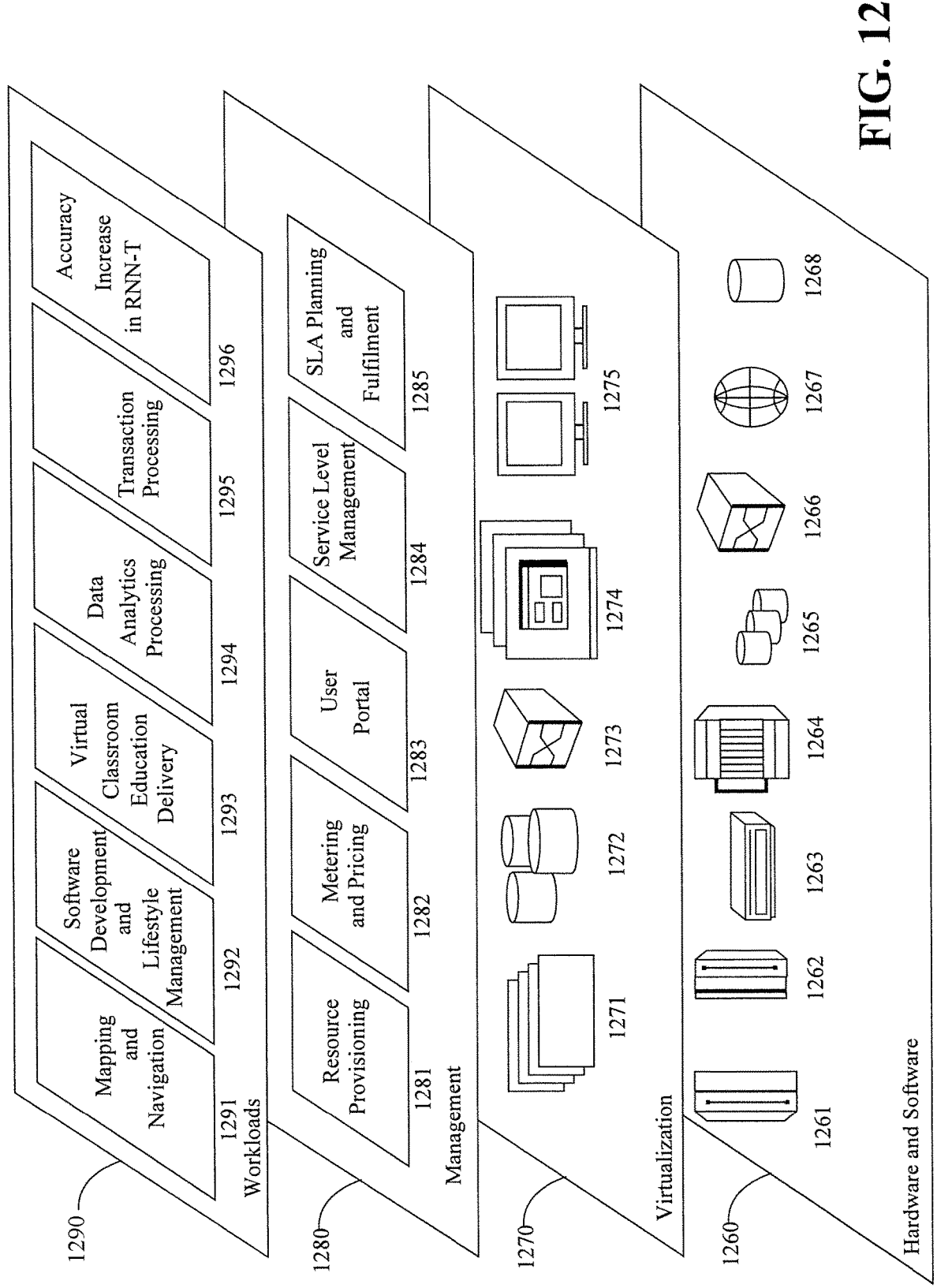
FIG. 12 is a block diagram showing a set of functional abstraction layers provided by a cloud computing environment, in accordance with an embodiment of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and accuracy increase in RNN-T for end-to-end speech recognition 1296.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for model training, comprising:
   training a second end-to-end neural speech recognition model that has a bidirectional encoder to output same symbols from an output probability lattice of the second end-to-end neural speech recognition model as from an output probability lattice of a trained first end-to-end neural speech recognition model haying a unidirectional encoder; and
   building a third end-to-end neural speech recognition model that has a unidirectional encoder by training the third end-to-end speech recognition model as a student by using the trained second end-to-end neural speech recognition model as a teacher in a knowledge distillation method, the first and third end-to-end neural speech recognition models being configured to stream output data from a recurrent neural network transducer (RNN-T), and the second end-to-end neural speech recognition model provides the output data offline.

2. The computer-implemented method of claim 1, wherein training the second end-to-end speech recognition model includes:
   obtaining a 1-best symbol for each of nodes of the output probability lattice of the first end-to-end neural speech recognition model by feeding training audio data to the first reference end-to-end speech recognition model, selecting the 1-best symbol from each node in the output posterior lattice, and outputting the 1 best symbol for each node from the unidirectional encoder for training the bidirectional encoder; and
   minimizing an end-to-end neural speech recognition model loss and also a cross entropy loss regarding the 1-best symbol.

3. The computer-implemented method of claim 2, wherein a weighted summation of the cross entropy loss and the end-to-end speech recognition model loss is minimized.

4. The computer-implemented method of claim 2, wherein training the third end-to-end neural speech recognition model includes:
   masking less probable nodes of the output probability lattice of the second end-to-end neural speech recognition model with respect to a minimum probability threshold; and
   jointly minimizing (i) the end-to-end neural speech recognition model loss and (ii) a relative divergence over unmasked portions of the output probability lattice of the second end-to-end neural speech recognition model to an output probability lattice of the third end-to-end speech recognition model.

5. The computer-implemented method of claim 4, wherein the relative divergence is a Kullback-Leibler divergence.

6. The computer-implemented method of claim 1, wherein training the second end-to-end speech recognition model further includes inputting training audio data into the trained first end-to-end neural speech recognition model to obtain the output probability lattice of the second end-to-end neural speech recognition model.

7. The computer-implemented method of claim 1, wherein each of the nodes of the output probability lattice of the second end-to-end neural speech recognition. model represent a softmax operation.

8. The computer-implemented method of claim 1, further comprising performing speech recognition by performing a beam search over an output probability lattice of the trained third end-to-end neural speech recognition model.

9. The computer-implemented method of claim 1, wherein the second end-to-end neural speech recognition model comprises a more complex neural network than the first end-to-end neural speech recognition model.

10. The computer-implemented method of claim 1, thither comprising evaluating the output probability lattice of the third end-to-end neural speech recognition model based on a similarity to the output probability lattice of the second end-to-end speech recognition system.

11. The computer-implemented method of claim 1, wherein the third end- to-end neural speech recognition system is trained until the similarity between the output probability lattices of the third and second end-to-end neural speech recognition models is within a particular similarity range.

12. The computer-implemented method of claim 1, wherein the method is performed by a speech recognition system.

13. The computer-implemented method of claim 1, wherein at least one of the first, second and third neural speech recognition models comprise a Recurrent Neural Network Transducer model.

14. The computer-implemented method of claim 1, wherein the second end-to-end neural speech recognition model comprises an ensemble of end-to-end neural speech recognition models, and the method further comprises selecting a best teacher model from the ensemble responsive to an overlap of search paths through an output probability lattice of each of the end-to-end neural speech recognition models in the ensemble.

15. A computer program product for model training, the computer program product comprising a non-transitory computer readable storage medium having program instructions embodied therewith, the program instructions executable by a computer to cause the computer to perform a method comprising:
   training a second end-to-end neural speech recognition model that has a bidirectional encoder to output same symbols from an output probability lattice of the second end-to-end neural speech recognition model as from an output probability lattice of a trained first end-to-end neural speech recognition model having, a unidirectional encoder; and
   building a third end-to-end neural speech recognition model that has a unidirectional encoder by training the third end-to-end speech recognition model as a student by using the trained second end-to-end neural speech recognition model as a teacher in a knowledge distillation method, the first and third end-to-end neural speech recognition models being configured to stream output data from a recurrent neural network transducer (RNN-T), and the second end-to-end neural speech recognition model provides the output data offline.

16. The computer-implemented method of claim 15, wherein training the second end-to-end speech recognition model includes:
   obtaining a 1-best symbol for each of nodes of the output probability lattice of the first end-to-end neural speech recognition model by feeding training audio data to the first reference end-to-end speech recognition model, selecting the 1-best symbol from each node in the output posterior lattice, and outputting the 1 best symbol for each node from the unidirectional encoder for training the bidirectional encoder; and minimizing an end-to-end neural speech recognition model loss and also a cross entropy loss regarding the 1-best symbol.

17. The computer-implemented method of claim 16, wherein a weighted summation of the cross entropy loss and the end-to-end speech recognition model loss is minimized.

18. The computer-implemented method of claim 16, wherein training the third end-to-end neural speech recognition model includes:

masking less probable nodes of the output probability lattice of the second end-to-end neural speech recognition model with respect to a minimum probability threshold; and jointly minimizing (i) the end-to-end neural speech recognition model loss and (ii) a relative divergence over unmasked portions of the output probability lattice of the second end-to-end neural speech recognition model to an output probability lattice of the third end-to-end speech recognition model.

19. A computer processing system for model training, comprising:

a memory device for storing program code; and a hardware processor operatively coupled to the memory device for running the program code to;

train a second end-to-end neural speech recognition model that has a bidirectional encoder to output same symbols from an output probability lattice of the second end-to-end neural speech recognition model as from an output probability lattice of a trained first end-to-end neural speech recognition model having a unidirectional encoder; and build a third end-to-end neural speech recognition model that has a unidirectional encoder by training the third end-to-end speech recognition model as a student by using the trained second end-to-end neural speech recognition model as a teacher in a knowledge distillation method, the first and third end-to-end neural speech recognition models being configured to stream output data from a recurrent neural network transducer (RNN-T), and the second end-to-end neural speech recognition model provides the output data offline.

* * * * *